(12) United States Patent
Nelson et al.

(10) Patent No.: US 11,704,948 B2
(45) Date of Patent: Jul. 18, 2023

(54) MOBILE DEVICE VEHICLE BONDING WITH INACTIVE BOND RECORDS

(71) Applicant: Ford Global Technologies, LLC, Dearborn, MI (US)

(72) Inventors: Tom Nelson, Plymouth, MI (US); Vivekanandh Elangovan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 17/325,651

(22) Filed: May 20, 2021

(65) Prior Publication Data
US 2022/0375285 A1    Nov. 24, 2022

(51) Int. Cl.
*H04W 4/40* (2018.01)
*G07C 9/00* (2020.01)
(Continued)

(52) U.S. Cl.
CPC .......... *G07C 9/00309* (2013.01); *H04W 4/40* (2018.02); *H04W 4/80* (2018.02); *H04W 12/082* (2021.01);
(Continued)

(58) Field of Classification Search
CPC ... H04W 12/069; H04W 12/082; H04W 4/80; H04W 12/03; H04W 12/50; H04W 4/40; H04W 4/44; G07C 2009/0038; G07C 2009/00769; G07C 9/00309; G07C 5/008; G07C 2009/00412; G07C 5/002; H04L 2209/80; H04L 2209/84; H04L 9/3271; H04L 9/3273; G08B 21/0272; G08B 21/0275; G06Q 30/0266; G06Q 30/0267; G01S 19/17; G01S 19/51; G01S 2205/06; G01S 5/0036; G01S 5/0081; G01S 5/0231; G01S 5/0249; G01S 5/0295; B64U 2101/30; B64U 2201/104; B64C 39/024; B64D 47/08
See application file for complete search history.

(56) References Cited

U.S. PATENT DOCUMENTS 9,282,582 B1    3/2016  Dunsbergen et al.
11,145,180 B2 * 10/2021  Gillum .................. G01S 5/0249
(Continued)

OTHER PUBLICATIONS

Jian Yang et al, "Using Bluetooth Low Energy for Dynamic Information-Sharing in Vehicle-to-Vehicle Communication", SAE International, Mar. 28, 2017, 8 pages.

*Primary Examiner* — Dionne Pendleton
(74) *Attorney, Agent, or Firm* — Frank Lollo; Eversheds Sutherland (US) LLP (57) ABSTRACT

A method for forming bonded mobile device connection with a vehicle includes determining a request count comprising a plurality of Bluetooth advertisement requests received from a mobile device with respect to time, determining an invalid Consumer Access Key (CAK) transmission count associated with the plurality of Bluetooth advertisement requests, generating an active bond record with the request count and the invalid CAK transmission count, determining, based on the active bond record, that a Global Attribute Profile (GATT) service associated with the mobile device is inactive, and disabling a Bluetooth advertisement response setting associated with the GATT service.

19 Claims, 4 Drawing Sheets

(51) Int. Cl.
*H04W 12/082* (2021.01)
*H04W 4/80* (2018.01)
*H04W 12/50* (2021.01)

(52) U.S. Cl.
CPC .... *H04W 12/50* (2021.01); *G07C 2009/0038* (2013.01); *G07C 2009/00769* (2013.01)

(56) References Cited

U.S. PATENT DOCUMENTS

| | | |
|---|---|---|
| 2014/0073262 A1 | 3/2014 | Gutierrez et al. |
| 2014/0094995 A1* | 4/2014 | Scott ................ G07C 5/008 701/1 |
| 2014/0344062 A1* | 11/2014 | Lamont ............ G06Q 30/0267 705/14.64 |
| 2019/0246353 A1 | 8/2019 | Jensen et al. |

* cited by examiner

\# MOBILE DEVICE VEHICLE BONDING WITH INACTIVE BOND RECORDS

BACKGROUND

Phone-as-a-key (PaaK) allows the use of a smartphone to act as a key for traditional key fob functions, such as unlock, lock, remote start, lift gate access, mobilization authorization, and so on. In some instances, PaaK is implemented using Bluetooth Low Energy (BLE) in vehicle-to-mobile device communication systems. BLE may be inbuilt technology in many available smartphones and other smart devices, such as smart watches or other wearable devices.

Mobile devices may use a consumer access key (CAK) to authenticate a bonded connection between the device and a vehicle. When a CAK is deleted from the vehicle side of a phone-vehicle communication channel, or the phone side of the phone-vehicle communication channel, the mobile device BLE connection may continue to attempt to connect with the vehicle. It may be advantageous to keep the bond active from the perspective of the vehicle, but the CAK will be identified as invalid from the perspective of the vehicle without receipt of a valid CAK from the mobile device. Persistent attempts to connect may drain battery resources from the vehicle and the mobile device.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

One of the features of the PaaK system is the ability for a User to revoke a key from their phone when the keys are not required for that particular vehicle. This means that the CAK, which is the secret key between the vehicle and the user device, will be removed from the user device. However, that does not mean that the Bluetooth Low Energy (BLE) bonding between the phone and the vehicle is removed.

When the BLE connecting application on the mobile device is stopped, either from purposeful removal of the CAK, or by purposeful or inadvertent stopping of the communicating application on the mobile device, from the perspective of the vehicle communication system, the CAK is considered revoked from the perspective of the vehicle communication channel. Revoking the CAK does not necessarily mean that the bonding has been completely removed from the mobile device. One way of completely removing the bonding is to go manually in the Bluetooth settings of user device and delete the device i.e. "Forget this device." This is an arduous step for the user as they will have to perform this operation external from the PaaK smartphone application, and due to limitations in smartphone Application Programming Interfaces (APIs), the PaaK application cannot relay bonding removal steps to inform the user how to remove the bond. As a result, the bond may remain on the phone without the user's knowledge.

If a CAK is deleted and the User device comes within the BLE range of the vehicle and if the phone is locked, the vehicle will continuously attempt to connect to the user device and after creating a link layer connection, the PaaK BLE module will fail to discover BLE GATT services that will be absent when the CAK is revoked and consequently the mobile device will disconnect. When operating in an inactive state (e.g., the device is powered on but locked, and not actively used) the BLE signal may be advertised in most cases in a lower signal transmission rate (e.g., every 60 seconds, 90 seconds, etc.). When the mobile device is unlocked and in an active state, the BLE advertisement rate may often be increased in frequency (e.g., every 15 seconds, 30 seconds, etc.). The advertising rates for BLE may differ from device to device, but in most cases, there is a notable increase in BLE advertisement frequency when the mobile device is unlocked vs. powered on but in a locked state. Advertising a BLE signal when an inactive CAK is associated with a mobile device application often takes place in both states—locked states and unlocked states, and may result in an unnecessarily depleted energy storage onboard the mobile device. Even when the user is actively using the phone, the vehicle will try to connect, fail to discover the BLE GATT services, and terminate the link with the phone. This is an issue that will drain the smartphone battery and use memory and resources on the BLEM. From the perspective of the vehicle, responding repeatedly to invalid CAK bonding requests (e.g., the BLE advertisements) may occupy limited CAK key storage address space when the CAK is no longer needed or used, and may also unnecessarily cause vehicle battery depletion when the vehicle is in a keyed-off state.

It is advantageous to notify the user when the GATT services are no longer present on the phone, and safely remove the bonded vehicle in their smartphone settings. However, there are two possible reasons the GATT services could be missing. One, the CAK has been revoked as described above.

Another possible cause for a disabled CAK may be a disabled, removed, or otherwise inactive instantiation of the mobile application used to bond the mobile device to the vehicle through BLE communication protocols. In the second case, the CAK may be active but the app has been terminated due a bug in the smartphone application, operating system policy, or user action. Sending a notification to the user may inadvertently inform the user to remove their CAK bond. It may be advantageous to provide a more reliable way of informing the user to remove their bond after a CAK revoke.

Illustrative Embodiments

The disclosure will be described more fully hereinafter with reference to the accompanying drawings, in which example embodiments of the disclosure are shown, and not intended to be limiting.

Figure 1:
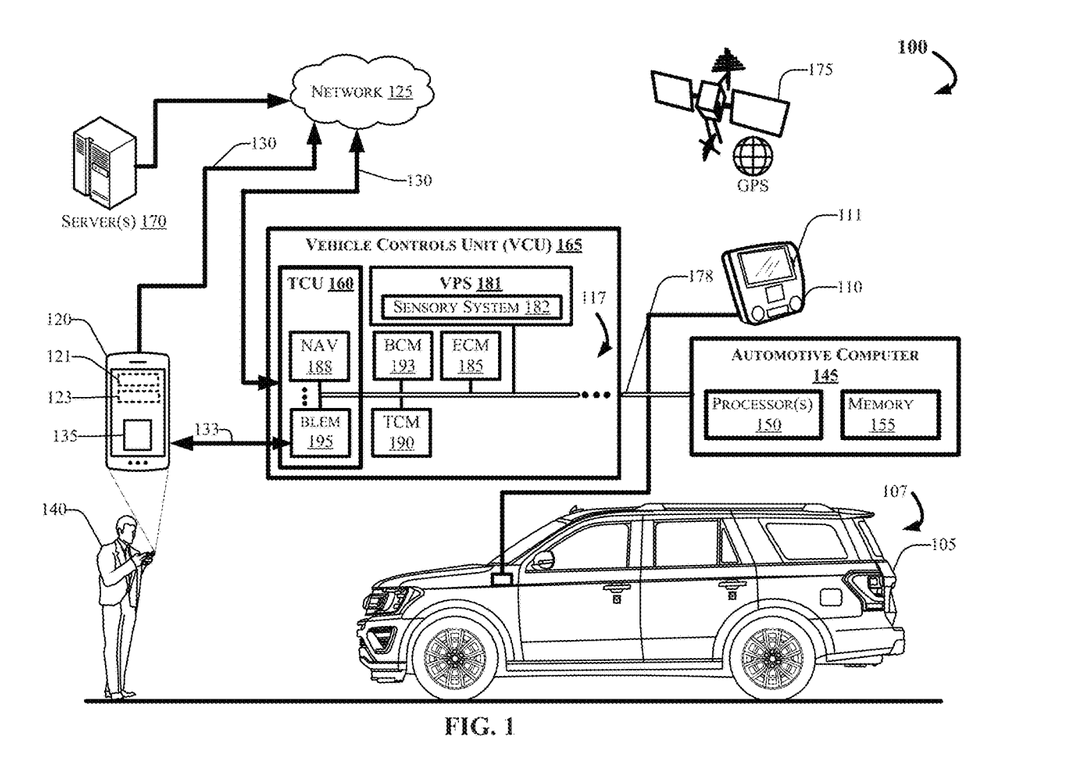
FIG. 1 depicts an example computing environment in which techniques and structures for providing the systems and methods disclosed herein may be implemented.

FIG. 1 depicts an example computing environment 100 that can include a vehicle 105 disposed in communication with a mobile device 120. The vehicle 105 may include an automotive computer 145, and a Vehicle Controls Unit (VCU) 165 that can include a plurality of electronic control units (ECUs) 117 disposed in communication with the automotive computer 145.

The mobile device 120, which may be associated with a user 140 and the vehicle 105, may connect with the automotive computer 145 using wireless communication protocols and transceivers. The mobile device 120 may be communicatively coupled with the vehicle 105 via one or more network(s) 125, which may communicate via one or more wireless connection(s) 130, and/or may connect with the vehicle 105 directly using near field communication (NFC) protocols, Bluetooth® protocols, Wi-Fi, Ultra-Wide Band (UWB), and other possible data connection and sharing techniques.

In some aspects, the mobile device 120 may be paired with the vehicle 105, where the mobile device 120 and vehicle 105 exchanges information necessary to establish an encrypted connection between the mobile device 120 and vehicle 105. Pairing may include authenticating an identity of the mobile device 120 to the vehicle 105, and vice versa, encrypting the wireless link, and distributing keys that allow security to be restarted on a reconnection. CAK is considered a long-term key (LTK) that is distributed once the initial pairing procedure has encrypted the connection. The CAK may include a random number stored in a security database or be generated on a slave device.

In other aspects, the mobile device 120 and the vehicle 105 may establish a bonded connection. Bonding is a process where information from the pairing process is stored in the vehicle 105 and the mobile device 120 in the form of a CAK, such that the pairing process does not have to be repeated every time the mobile device 120 and vehicle 105 reconnect to each other.

The vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a sport utility, the vehicle 105 may take the form of another passenger or commercial automobile such as, for example, a car, a truck, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard power plant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

The mobile device 120 can include a memory 123 for storing program instructions associated with an application 135 that, when executed by a mobile device processor 121, performs aspects of the disclosed embodiments. The application (or "app") 135 may be part of the mobile device vehicle bonding management system 107, or may provide information to the mobile device vehicle bonding management system 107 and/or receive information from the mobile device vehicle bonding management system 107. For example, the memory 123 may store a mobile device version of the CAK used in vehicle/mobile device bonded connections.

In some aspects, the mobile device 120 may communicate with the vehicle 105 through the one or more wireless connection(s) 130, which may be encrypted and established between the mobile device 120 and a Telematics Control Unit (TCU) 160 by way of the CAK as the bonded key mechanism. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) 133 that can be direct connection(s) between the vehicle 105 and the mobile device 120. The wireless connection(s) 133 may include various low-energy protocols including, for example, Bluetooth®, Bluetooth® Low-Energy (BLE®), UWB, Near Field Communication (NFC), or other protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the mobile device vehicle bonding management system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a mobile device vehicle bonding management program code. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, etc. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets received from the application 135 operating on the mobile device 120, from one or more instruction sets stored in computer memory 155 of the automotive computer 145, including instructions operational as part of the mobile device vehicle bonding management system 107.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 178. In some aspects, the TCU 160 may retrieve data and send data as a node in a CAN bus.

The BLEM 195 may establish wireless communication using Bluetooth® and/or BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The bus 178 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 178 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the mobile device vehicle bonding management system 107, and/or the server(s) 170, etc.), and may also communicate with one another without the necessity of a host computer. The bus 178 may connect the ECUs 117 with the automotive computer 145 such that the automotive computer 145 may retrieve information from, send information to, and otherwise interact with the ECUs 117 to perform steps described according to embodiments of the present disclosure. The bus 178 may connect CAN bus nodes (e.g., the ECUs 117) to each other through a two-wire bus, which may be a twisted pair having a nominal characteristic impedance. The bus 178 may also be accomplished using other communication protocol solutions, such as Media Oriented Systems Transport (MOST) or Ethernet. In other aspects, the bus 178 may be a wireless intra-vehicle bus.

The VCU 165 may control various loads directly via the bus 178 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the mobile device vehicle bonding management system 107, and/or via wireless signal inputs received via the wireless connection(s) 133 from other connected devices such as the mobile device 120, among others. The ECUs 117, when configured as nodes in the bus 178, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

The computing system architecture of the automotive computer 145, the VCU 165, and/or the mobile device vehicle bonding management system 107 may omit certain computing modules. It should be readily understood that the computing environment depicted in FIG. 1 is an example of a possible implementation according to the present disclosure, and thus, it should not be considered limiting or exclusive.

The automotive computer 145 may connect with an infotainment system 110 that may provide an interface for the navigation and GPS receiver 188, and the mobile device vehicle bonding management system 107. For example, CAKs may be deleted, enabled, or otherwise managed using the infotainment system 110.

The infotainment system 110 may include a touchscreen interface portion 111, and may include voice recognition features, biometric identification capabilities that can identify users based on facial recognition, voice recognition, fingerprint identification, or other biological identification means. In other aspects, the infotainment system 110 may provide user identification using mobile device pairing techniques (e.g., connecting with the mobile device 120, a Personal Identification Number (PIN)) code, a password, passphrase, or other identifying means.

Figure 2:
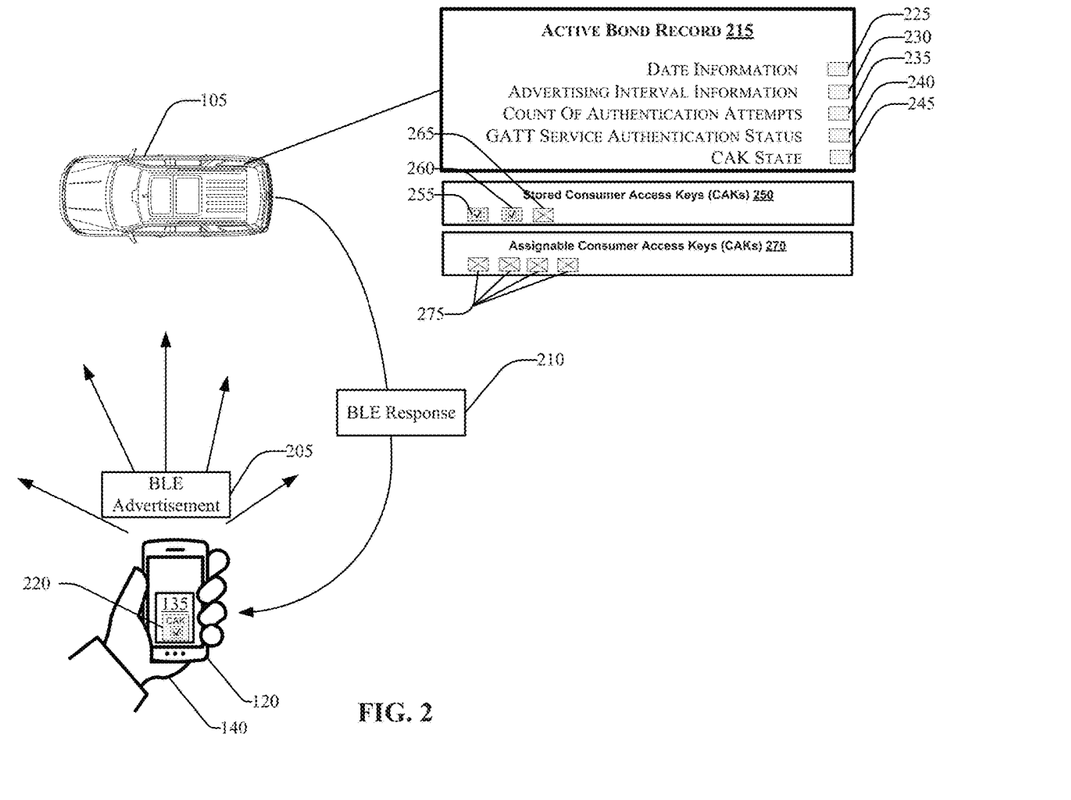
FIG. 2 illustrates a mobile device vehicle bonding management system in accordance with the present disclosure.

FIG. 2 illustrates a mobile device vehicle bonding management system 107 in accordance with the present disclosure. The mobile device vehicle bonding management system 107 includes the vehicle 105 disposed in communication with the mobile device 120. The mobile device, during a typical bonded BLE communication interaction may send a BLE advertisement 205, and receive a BLE response 210 from the vehicle 105 associated with the BLE advertisement 205.

The mobile device 120 may be active (e.g., unlocked) or inactive (e.g., powered on but in a locked state), or in passive use, powered on, but not in an unlocked state. For example, when the CAK is removed or revoked on the mobile device 120, and the mobile device 120 comes within the range of the vehicle 105 BLE and when the mobile device 120 is locked, the advertisement interval of the BLE advertisement 205 is either at 180 msec or 230 msec depending upon manufacturer specification of the mobile device 120. Other advertising intervals are possible and contemplated. But when the phone is unlocked and the user 140 is actively using the mobile device 120, the advertisement 205 interval may be faster (e.g., 30 msec.) as compared with the advertisement interval used when the mobile device 120 is in a passive state.

Accordingly, using the advertising interval, the mobile device vehicle bonding management system 107 can determine if the mobile device 120 is in active or passive use. If the Phone as a Key (PaaK) application (e.g., the application 135) or other mobile application associated with the bonded vehicle 105 communication channel is not behaving as expected (e.g., the mobile device 120 fails to return a valid CAK 220 subsequent to receiving the BLE response 210), the first thing the user 140 may do is to unlock the mobile device 120 and launch the application 135. Therefore, if the advertising rate is elevated and there are no GATT services present, the mobile device vehicle bonding management system 107 may programmatically determine that the CAK 220 associated with the application 135 stored on the mobile device 120 has been removed, and that the application 135 has not temporary terminated.

Embodiments of the present disclosure describe a method for detecting when the mobile device 120 is advertising at a higher rate, with no GATT services (e.g., the application 135) present. The mobile device vehicle bonding management system 107 may store historic data associated with the detecting steps in an active bond record 215. Additionally, introducing a configurable frequency counter could also be used to create a statistical threshold. For instance, it is not enough for the formula to detect the advertising rate of the BLE phone and the absences of the GATT services as the application 135 could temporarily be in a terminated state.

The active bond record 215 may include a frequency counter configured and/or programmed to record multiple instances of this state to gain a confidence value. A confidence value may be a value indicative of a degree of confidence the system 107 has in determining whether a mobile device has permanently or temporarily deleted a CAK. A high confidence value may be, for example, 60% confidence, 80% confidence, etc.

The active bond record 215 may include date information 225 associated with bonded communication attempts received from the mobile device 120, and advertising interval information 230 having interval rates associated with the BLE advertisement 205. The Advertising interval information 230 may be associated respectively with one or more dates recorded in the date information 225. For example, on date x, the recorded advertising rate may include information having the rate identified at that communications attempt instance. When there are numerous attempts from a mobile device to attempt to form a boded connection, and the mobile device is sending those attempts in an inactive state (e.g., powered on but not active), the confidence value may be increased that the connection is temporarily disabled. However, when attempts are made when the mobile device is in an active state, that confidence value may increase since the user is actively using the mobile device but not responding to an invalid CAK situation that prevents access to the vehicle connection.

The active bond record 215 may further include a count of authentication attempts 240. This data can include a number of times a particular mobile device (e.g., the mobile device 120) sent BLE advertisement 205 given a date or range of dates. For example, the count of authentication attempts may record that the mobile device 120 transmitted a BLE advertisement 120 times during a 7-day period. A relatively higher number of attempts given a fixed time period (e.g., 2 days, 5 days, etc.) may militate toward a higher confidence value for permanent deleted CAKs.

The active bond record 215 may further include a CAK authentication status associated with a particular CAK 220 associated with the mobile device 120. The CAK authentication status may include information associated with one or more GATT services associated with the mobile device 120. For example, the system may determine a request count comprising a plurality of Bluetooth advertisement requests 205 received from the mobile device 120 with respect to time. The mobile device vehicle bonding management system 107 may determine an invalid CAK transmission count associated with the plurality of Bluetooth advertisement requests, and store the date information 225 and advertising interval information 230 in the active bond record 215.

After a predetermined number of authentication attempts during a date or range of dates associated with the date information 225, and further based on the advertising rate interval information 230, the mobile device vehicle bonding management system 107 may determine that the mobile device 120 has temporarily or permanently disabled the GATT service(s) associated with the application 135. Accordingly, the GATT service authentication status 240 may indicate a current status for the GATT service associated with the mobile device 120 (e.g., the application 135) that is or has previously been associated with the vehicle stored CAK. Example statuses can include enabled, temporarily disabled, or permanently deleted, and disable the BLE response 210 setting associated with the GATT service (e.g., the application 135).

The active bond record 215 may further include a CAK state associated with the CAK associated with the application 135. For example, the vehicle 105 may include in its memory a stored consumer access keys 250 having one or more CAKs that are active or temporarily disabled for BLE response communications. In one example, two active CAKs 255 and 260 may be in the stored CAKs 250, and a third CAK 265 may stored but in a disabled state. The CAK state 245 may record an active, disabled or deleted state associated with respective CAKs associated with the mobile device 120.

In some aspects, the mobile device vehicle bonding management system 107 may determine that the CAK at issue may have been permanently deleted on the mobile device 120. This may be due to an intentional removal by the user 140, such as in the case of deleting the application 135 from the mobile device 120, or disabling the bonded communication viability through the application 135, among other possibilities. In other aspects, the application 135 may have been inadvertently stopped, and but may never be instantiated by the user 140 because the application and bonded connection is unused and unneeded by the user 140. Accordingly, regardless of the intent of rendering the application 135 and the CAK 220 unusable, the mobile device vehicle bonding management system 107 may permanently delete the vehicle stored CAK, and move the CAK to an assignable CAK store 270 that contains assignable CAKs 275 that may be assigned to new authenticated requests for bonded connections to the vehicle 105.

Figure 3:
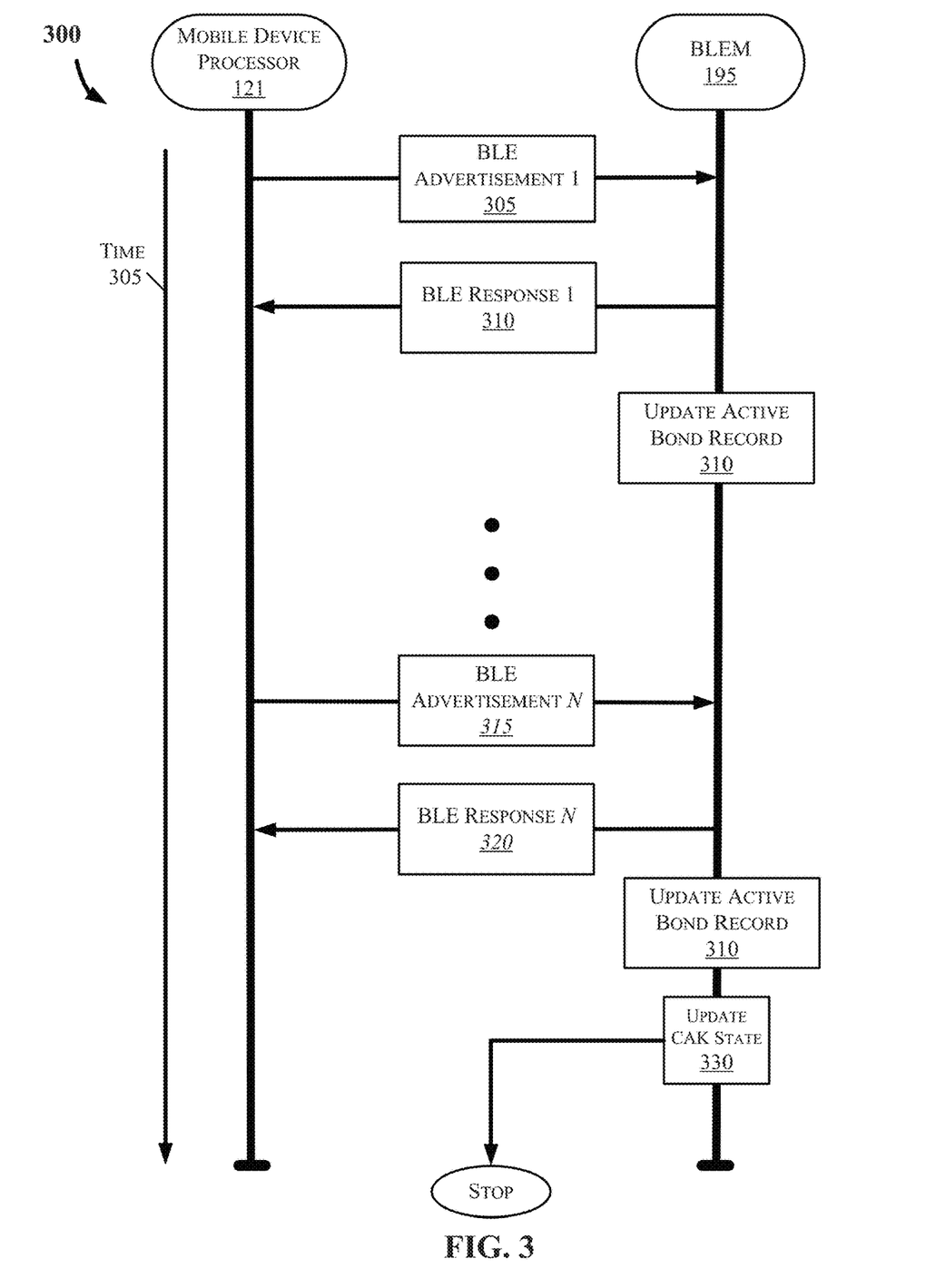
FIG. 3 depicts a flow diagram for managing mobile device and vehicle bonding in accordance with the present disclosure.

FIG. 3 depicts a flow diagram illustrating a logical flow 300 for managing mobile device and vehicle bonding in accordance with the present disclosure. The logical flow 300 may commence with a first BLE advertisement (BLE advertisement 1 305), which may originate from the mobile device processor 121 (as shown in FIG. 1) and be received by the vehicle BLEM 195. More particularly, the mobile device processor 121 may cause a transmitter (not shown in FIG. 3) to transmit the BLE advertisement 1 305 (which may be, for example, the BLE advertisement 205 as shown with respect to FIG. 2). At step 310 the BLEM 195 may transmit a BLE Response 1 to the mobile device processor 121. Responsive to receiving the BLE advertisement 1 at step 305 and sending the BLE response at step 310, the processor 150 may determine a request count comprising a plurality of Bluetooth advertisement requests received from a mobile device with respect to time, and generate the active bond record 215 with the request count and the invalid CAK transmission count. Accordingly, at step 310, the processor 150 may update the active bond record 215 with date information 225, and advertising interval information 230 (as shown in FIG. 2) associated with the BLE advertisement 1 305.

The mobile device vehicle bonding management system 107 may determine a count of authentication attempts 235, and keep track of the count associated with each of the respective attempts, as shown in FIG. 3 as the BLE advertisement N 315 and respective BLE response N 320.

The system may determine, based on the active bond record 215, that a Global Attribute Profile (GATT) service associated with the mobile device 120 is inactive, and disable a Bluetooth advertisement response setting (not shown in FIG. 3) associated with the GATT service. For example, in one embodiment, the mobile device vehicle bonding management system 107 may determine, based on the active bond record 215, that the mobile device 120 is temporarily in a disabled state. This may be because the application 135 has been purposely or inadvertently stopped on the mobile device 120, or for any number of other reasons that did not originate with a purposeful and permanent action by the user 140.

The mobile device vehicle bonding management system 107 may disable the vehicle-stored CAK 250 associated with the GATT service on the mobile device 120 by disabling subsequent Bluetooth advertisement responses 210, and updating the active bond record to include a disabled status of the vehicle-stored CAK. More particularly, the mobile device vehicle bonding management system 107 may update the GATT service authentication status 240 to show that the CAK key (e.g., 265 as shown in FIG. 2) is currently inactive, while maintaining the key in the stored CAKs 250. Accordingly, disabling the Bluetooth advertisement response setting associated with the GATT service may include disabling any subsequent BLE responses 210 until the GATT service is re-enabled from the mobile device 120 and/or the vehicle infotainment system 110 (as shown in FIG. 1).

According to another embodiment, updating the CAK state at step 330 may include determining, based on the active bond record, that the mobile device is permanently in a disabled state, and deleting a vehicle stored CAK from the stored CAKs 250. Accordingly, the system may add the vehicle stored CAK to a keystore list of assignable CAKs 275 stored in the assignable CAKs 270. This step may prevent the vehicle Bluetooth chip (not shown in FIG. 2) from connecting to an unused mobile device, and prevent power usage on the mobile device 120 and the vehicle 105 unnecessarily.

Figure 4:
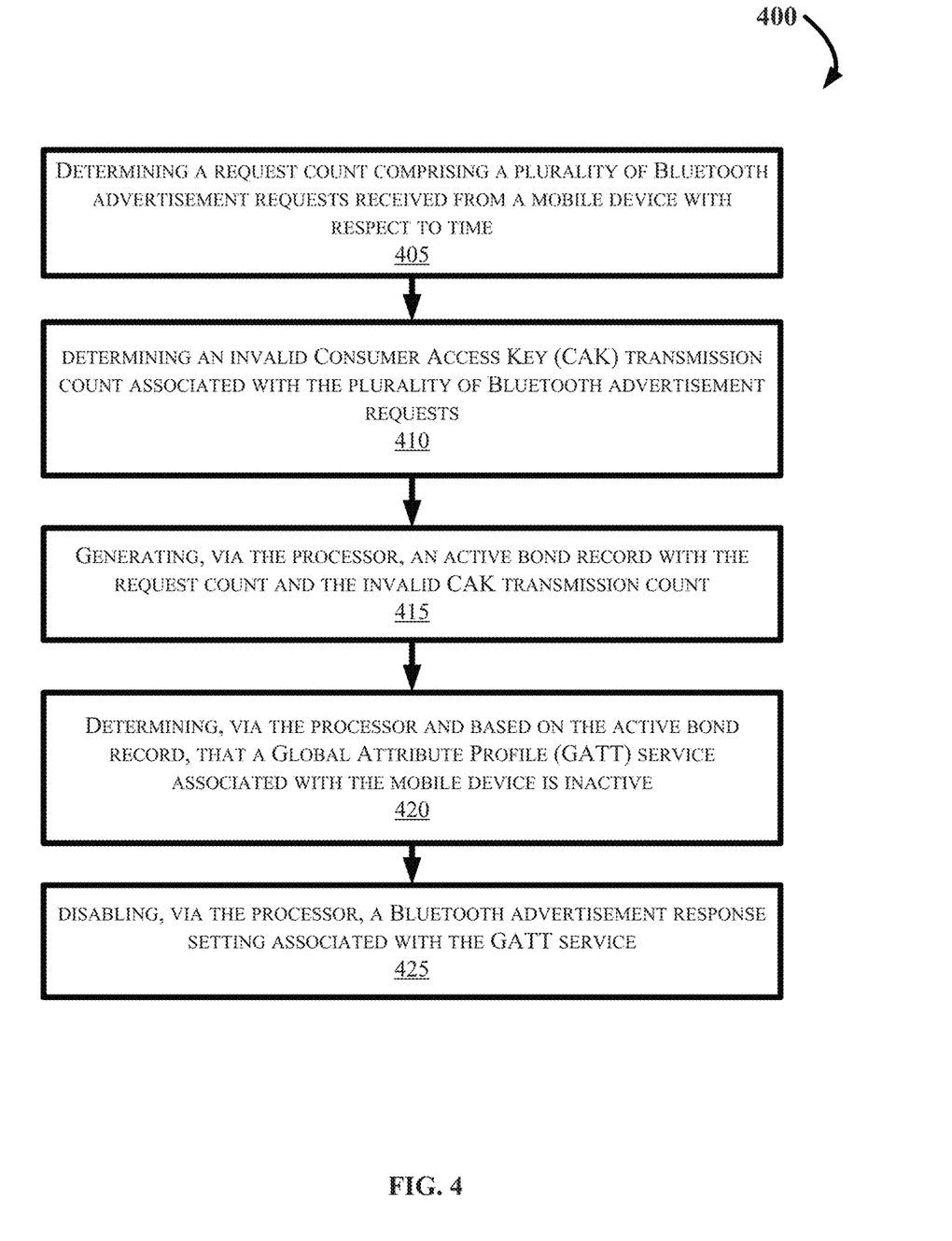
FIG. 4 depicts a flow diagram of an example method for forming bonded mobile device connection with a vehicle in accordance with the present disclosure.

FIG. 4 illustrates an example flow diagram for a method of managing a mobile device and vehicle bonded communication channel in accordance with the present disclosure. FIG. 4 may be described with continued reference to prior figures, including FIGS. 1-3. The following process is exemplary and not confined to the steps described hereafter. Moreover, alternative embodiments may include more or less steps that are shown or described herein, and may include these steps in a different order than the order described in the following example embodiments.

At step 405, the method 400 may commence with determining a request count comprising a plurality of Bluetooth advertisement requests received from a mobile device with respect to time.

At step 410, the method 400 may further include determining an invalid Consumer Access Key (CAK) transmission count associated with the plurality of Bluetooth advertisement requests.

At step 415, the method 400 may further include generating, via the processor, an active bond record with the request count and the invalid CAK transmission count. This step may include either creating the active bond record or updating an existing active bond record.

At step 420, the method 400 may further include determining, via the processor and based on the active bond record, that a Global Attribute Profile (GATT) service associated with the mobile device is inactive. This step may include determining, based on the active bond record, that the mobile device is temporarily in a disabled state, disabling a vehicle-stored CAK by disabling subsequent Bluetooth advertisement responses, and updating the active bond record to include a disabled status of the vehicle-stored CAK. The system may determine that the mobile device is temporarily in a disabled state by determining that the invalid CAK count exceeds a first invalid CAK count threshold, determining that the invalid CAK count was received within a first time threshold, and deleting a vehicle-stored CAK.

In another example embodiment, the method may further include determining, based on the active bond record, that the mobile device is permanently in a disabled state. When the second time threshold is less than a first time threshold associated with determining that the mobile device is permanently inactive, the mobile device vehicle bonding management system 107 may determine that the mobile device is permanently in the disabled state. Accordingly, the method may include determining, based on the active bond record, deleting a vehicle-stored CAK; and adding the vehicle-stored CAK to a keystore list of assignable CAKs. Determining that the mobile device is permanently in a disabled state can include determining that the invalid CAK count exceeds a second invalid CAK count threshold, determining that the invalid CAK count was received within a second time threshold.

At step 425, the method 400 may further include disabling, via the processor, a Bluetooth advertisement response setting associated with the GATT service. This step may include disabling the CAK or deleting the CAK.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for forming a bonded mobile device connection with a vehicle, comprising:
    determining, by a processor, a request count comprising a plurality of mobile communication advertisement requests received from a mobile device with respect to time;
    determining, by the processor, an invalid consumer access key (CAK) transmission count associated with the plurality of mobile communication advertisement requests;
    generating, by the processor and based on the request count and the invalid CAK transmission count, an active bond record;

determining, by the processor and based on the active bond record, that a global attribute profile (GATT) service associated with the mobile device is inactive; and disabling, by the processor, a mobile communication advertisement response setting associated with the GATT service.

2. The method according to claim 1, wherein disabling the mobile communication advertisement response comprises:

determining, based on the active bond record, that the mobile device is temporarily in a disabled state;

disabling a vehicle-stored CAK by disabling subsequent mobile communication advertisement responses; and updating the active bond record to include a disabled status of the vehicle-stored CAK.

3. The method according to claim 2, wherein determining that the mobile device is temporarily in the disabled state comprises:

determining that the invalid CAK transmission count exceeds a first invalid CAK count threshold;

determining that the invalid CAK transmission count was received within a first time threshold; and deleting the vehicle-stored CAK.

4. The method according to claim 1, wherein disabling the GATT service comprises:

determining, based on the active bond record, that the mobile device is permanently in a disabled state;

deleting a vehicle-stored CAK; and adding the vehicle-stored CAK to a keystore list of assignable CAKs.

5. The method according to claim 4, wherein determining that the mobile device is permanently in the disabled state comprises:

determining that the invalid CAK transmission count exceeds a second invalid CAK count threshold;

determining that the invalid CAK transmission count was received within a second time threshold; and deleting the vehicle-stored CAK.

6. The method according to claim 5, wherein the second time threshold is less than a first time threshold associated with determining that the mobile device is permanently inactive.

7. The method according to claim 1, further comprising causing to transmit, by the processor, an information packet comprising information that, when executed by the mobile device, causes the mobile device to generate a user message comprising instructions for causing, via the processor, the mobile device to enable the GATT service to form the bonded mobile device connection with the vehicle.

8. A bonded mobile device management system for a vehicle, comprising:

a processor; and a memory for storing executable instructions, the processor programmed to execute the instructions to:

determine a request count comprising a plurality of Bluetooth advertisement requests received from a mobile device with respect to time;

determine an invalid consumer access key (CAK) transmission count associated with the plurality of Bluetooth advertisement requests;

generate an active bond record with the request count and the invalid CAK transmission count;

determine, based on the active bond record, that a global attribute profile (GATT) service associated with the mobile device is inactive; and disable a Bluetooth advertisement response setting associated with the GATT service.

9. The system according to claim 8, wherein the processor is further programmed to disable the Bluetooth advertisement response by executing the instructions to:

determine, based on the active bond record, that the mobile device is temporarily in a disabled state;

disable a vehicle-stored CAK by disabling subsequent Bluetooth advertisement responses; and update the active bond record to include a disabled status of the vehicle-stored CAK.

10. The system according to claim 9 wherein the processor is further programmed to determine that the mobile device is temporarily in the disabled state by executing the instructions to:

determine that the invalid CAK transmission count exceeds a first invalid CAK count threshold;

determine that the invalid CAK transmission count was received within a first time threshold; and delete the vehicle-stored CAK.

11. The system according to claim 8, wherein the processor is further programmed to disable the GATT service by executing the instructions to:

determine, based on the active bond record, that the mobile device is permanently in a disabled state;

delete a vehicle-stored CAK; and add the vehicle-stored CAK to a keystore list of assignable CAKs.

12. The system according to claim 11, wherein the processor is further programmed to determine that the mobile device is permanently in the disabled state by executing the instructions to:

determine that the invalid CAK transmission count exceeds a second invalid CAK count threshold;

determine that the invalid CAK transmission count was received within a second time threshold; and delete the vehicle-stored CAK.

13. The system according to claim 12, wherein the second time threshold is less than a first time threshold associated with determining that the mobile device is permanently inactive.

14. The system according to claim 8, wherein the processor is further programmed to execute the instructions to:

cause to transmit an information packet comprising information that, when executed by the mobile device, causes the mobile device to generate a user message comprising instructions for causing, via the processor, the mobile device to enable the GATT service forming bonded mobile device connection with the vehicle.

15. A non-transitory computer-readable storage medium in a vehicle, the computer-readable storage medium having instructions stored thereupon which, when executed by a processor, cause the processor to:

determine a request count comprising a plurality of Bluetooth advertisement requests received from a mobile device with respect to time;

determine an invalid consumer access key (CAK) transmission count associated with the plurality of Bluetooth advertisement requests;

generate an active bond record with the request count and the invalid CAK transmission count;

determine, based on the active bond record, that a global attribute profile (GATT) service associated with the mobile device is inactive; and disable a Bluetooth advertisement response setting associated with the GATT service.

16. The non-transitory computer-readable storage medium according to claim 15, having further instructions stored thereupon to:
    determine, based on the active bond record, that the mobile device is temporarily in a disabled state;
    disable a vehicle-stored CAK by disabling subsequent Bluetooth advertisement responses; and
    update the active bond record to include a disabled status of the vehicle-stored CAK.

17. The non-transitory computer-readable storage medium according to claim 15, having further instructions stored thereupon to disable the Bluetooth advertisement response by:
    determining, based on the active bond record, that the mobile device is temporarily in a disabled state;
    disabling a vehicle-stored CAK by disabling subsequent Bluetooth advertisement responses; and
    updating the active bond record to include a disabled status of the vehicle-stored CAK.

18. The non-transitory computer-readable storage medium according to claim 17, having further instructions stored thereupon to determine that the mobile device is temporarily in the disabled state by:
    determining that the invalid CAK transmission count exceeds a first invalid CAK count threshold;
    determining that the invalid CAK transmission count was received within a first time threshold; and
    deleting the vehicle-stored CAK.

19. The non-transitory computer-readable storage medium according to claim 15, having further instructions stored thereupon to disable the GATT service by:
    determining, based on the active bond record, that the mobile device is permanently in a disabled state;
    deleting a vehicle-stored CAK; and
    adding the vehicle-stored CAK to a keystore list of assignable CAKs.

\* \* \* \* \*